Dec. 26, 1967 J. A. MAURER ET AL 3,359,638

DENTAL FOOT CONTROL CONSTRUCTION

Filed Dec. 9, 1964 4 Sheets-Sheet 1

INVENTORS
JOHN A. MAURER,
KENNETH R. LAPPIN &
DEAN H. BUCHTEL

BY Frease, Bishop, Johns & Schick

ATTORNEYS

Dec. 26, 1967   J. A. MAURER ET AL   3,359,638
DENTAL FOOT CONTROL CONSTRUCTION
Filed Dec. 9, 1964   4 Sheets-Sheet 2

INVENTORS
JOHN A. MAURER,
KENNETH R. LAPPIN &
DEAN H. BUCHTEL
BY
Frease, Bishop, Johns & Schick
ATTORNEYS INVENTORS
JOHN A. MAURER,
KENNETH R. LAPPIN &
DEAN H. BUCHTEL
BY Frease, Bishop, Johns & Schick
ATTORNEYS

United States Patent Office 3,359,638
Patented Dec. 26, 1967

3,359,638
DENTAL FOOT CONTROL CONSTRUCTION
John A. Maurer, Kenneth R. Lappin, and Dean H. Buchtel, Canton, Ohio, assignors to The Weber Dental Manufacturing Company, Canton, Ohio, a corporation of Ohio
Filed Dec. 9, 1964, Ser. No. 417,070
11 Claims. (Cl. 32—28)

ABSTRACT OF THE DISCLOSURE

A dental foot control construction for remotely controlling the drive operation of a dental handpiece having air and water coolant spray devices thereon. The foot control device includes an operating arm having cam means thereon for selective operation of the air or water coolant spray means, or a combination thereof simultaneously with the main drive control and operation of the dental handpiece.

---

Figure 1:
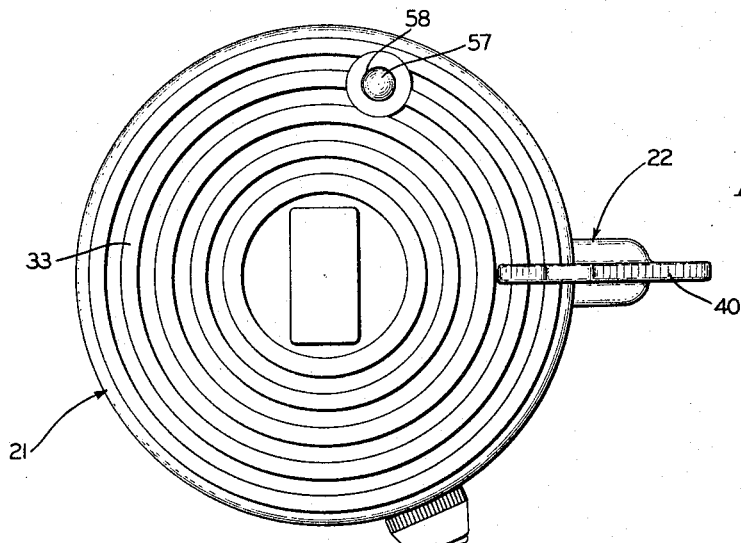

Our invention relates to improvements in dental foot controls of the type for remotely controlling the drive operation of a dental handpiece. More specifically, our invention relates to dental foot controls of the foregoing type arranged for the selection and operation of air coolant spray means, or combined air and water coolant spray means, on the dental handpiece simultaneously with the main drive control and operation of such dental handpiece, all of which may be accomplished by selected movements of a main operating arm on the foot control.

Certain prior constructions of dental foot controls have been provided with which not only the drive operation of a dental handpiece is controlled, but simultaneously therewith, coolant spray means on the dental handpiece is likewise controlled, so that when the foot control is manipulated for operating the dental handpiece drive, selected coolant spray means is also provided.

Prior to the present invention, however, the selection of the particular coolant spray means desired, that is, air alone or air and water mixed, has usually been accomplished by means of a coolant selection device mounted on the main dental instrument unit and such selection is required prior to any manipulation of the foot control.

Thus, the necessary procedure followed by the dentist using such a construction would be to first determine what form of coolant spray is desired simultanaeously with the drive operation of the dental handpiece, then manipulate the coolant selection device on the dental instrument unit appropriately for providing such coolant spray, and then manipulate the foot control for operating the drive of the dental handpiece as well as simultaneously the drive of the particular coolant spray selected.

During the performance of dental work by the dentist, for instance, the preparation of a cavity in a tooth, it is desirable during the various drilling operations with the dental handpiece to alternately use coolant sprays of air alone and air and water mixed, depending on the particular stage of preparation. Thus, in the use of these prior foot controls, every time that it is desirable for the dentist to change the form of coolant spray being used with the operation of the dental handpiece, it is necessary for the dentist to divert his attention to the coolant selection device on the dental instrument unit prior to manipulating the foot control for that particular stage of preparation. This is not only time consuming and can result in added discomfort to the patient, but can also require added preparation stages in order to maintain the highest quality of the particular dental work being performed.

Also, with the use of prior dental equipment, when it is desirable for the dentist to make use of solely an air spray, for instance, again during the preparation of a cavity in a tooth, it has been necessary to interrupt his use of the dental handpiece, replace the handpiece on a holder on the dental instrument unit, select a properly adjusted dental syringe, and manipulate the dental syringe to provide the air spray in order to accomplish a cleaning or chip blowing operation. Again, this results in the necessity of the dentist interrupting the particular dental work and diverting his attention to the dental instrument unit in order to accomplish the transfer from the dental handpiece to the dental syringe, as well as the retransfer after the use of the syringe has been completed.

It is, therefore, a general object of the present invention to provide dental foot control construction which solves the foregoing problems in a relatively simple and efficient manner.

It is a primary object of the present invention to provide dental foot control construction arranged so that the choice of coolant spray to be provided simultaneously with the drive of the dental handpiece may be accomplished merely by a selected manipulation of the operating arm on the foot control and without interruption of the dental work being performed nor the distraction of the dentist's attention from such dental work.

It is a further object of the present invention to provide dental foot control construction of the foregoing type with which the air spray alone of the dental handpiece may be controlled at the foot control without the water coolant spray or the dental handpiece main drive, so that air cleaning and chip blowing operations may be performed without the necessity of using the usual dental syringe.

It is still another object of the present invention to provide dental foot control construction of the foregoing type in a compact and efficient form having a minimum of maintenance problems.

It is an additional object of the present invention to provide dental foot control construction of the foregoing type which may be adapted for use with any of the various types of dental handpieces.

Finally, it is an object of the present invention to provide dental foot control construction which satisfies all of the above objects at a minimum of construction and material cost.

These and other objects are accomplished by the parts, constructions, arrangements, combinations and subcombinations comprising the present invention, preferred embodiments of which—illustrative of the best modes in which applicants have contemplated applying the principles—are set forth in the following description and illustrated in the accompanying drawings, and which are particularly and distinctly pointed out and set forth in the appended claims forming a part hereof.

In general terms, the dental foot control construction comprising the present invention may be stated as being of the type for remotely controlling the drive operation of a dental handpiece having air and water coolant spray devices thereon.

Specifically according to the principles of the present invention, the dental foot control construction includes a base, having an operating arm pivotally mounted thereon and pivotal between a normal non-actuating and first and second actuating positions. The mounting of the operating arm is preferably such that the arm is normally resiliently urged to a central neutral position, which is the non-actuating position, and is selectively movable in one direction to the first actuating position or in the opposite direction to the second actuating position from this neutral position.

Further the improved foot control construction includes drive control means, air coolant control means, and water coolant means, all mounted on the base and all selectively movable between normal non-operating and operating positions, preferably being normally resiliently urged to the non-operating positions. The drive control means is operably connected to the dental handpiece for operating the drive thereof when in operating position, the air coolant control means is operably connected to the air coolant spray device of the dental handpiece and the water coolant control means is operably connected to the water coolant spray device of the dental handpiece, each for providing the appropriate coolant spray at the appropriate spray device of the handpiece when in operating position.

Still further, the improved foot control construction includes actuating means operably connected to the operating arm constructed free of any effect on the various control means when the operating arm is in its normal non-actuating position at which time the various control means remain in their normal non-operating positions. This actuating means is further constructed for moving the drive and air coolant control means to operating positions without effect on the water coolant control means when the operating arm is pivoted to the first actuating position, and is also constructed for moving all three of the drive and air coolant and water coolant control means to operating positions when the operating arm is pivoted to the second actuating position. It is preferred that this actuating means will be in the form of a cam member mounted directly on and movable with the operating arm and having effective cam surfaces for accomplishing the movements of the three control means as set forth.

Finally, the foot control construction of the present invention may include a separate or independent air coolant control actuating device mounted on the base selectively operable for operating the air coolant control means independent of any operation of the drive control means and water coolant control means. In this way, an air coolant spray can be provided directly from the air coolant spray device on the dental handpiece independent of any operation of the drive of the dental handpiece and any operation of the water coolant spray device on the dental handpiece.

Figure 2:
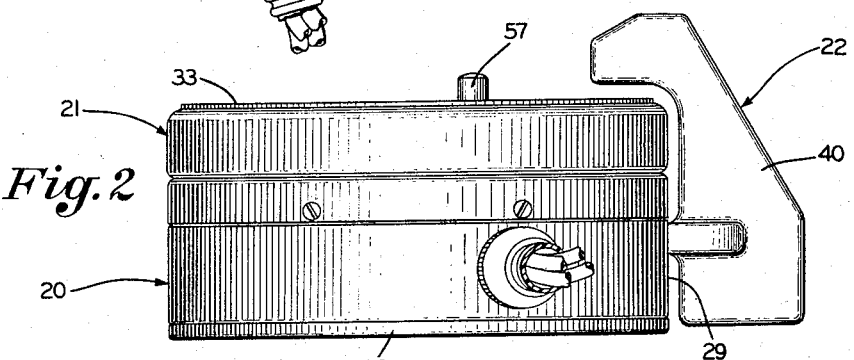
Figure 3:
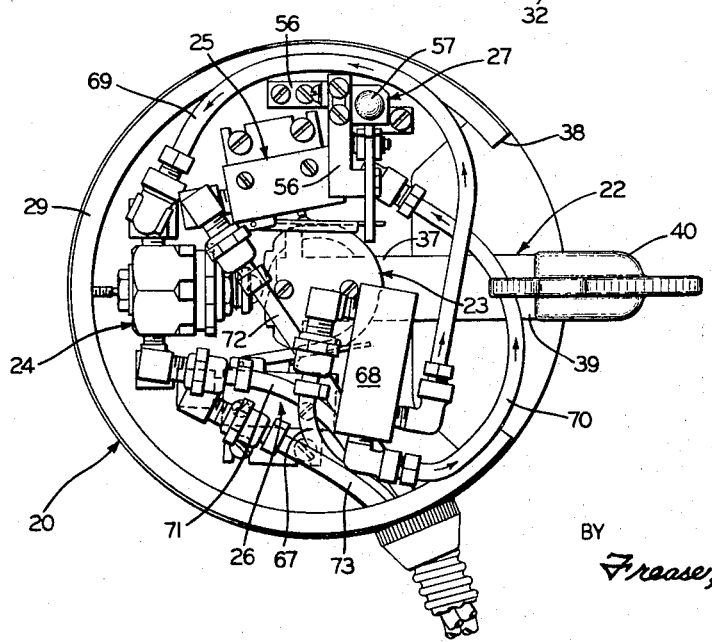
Figure 4:
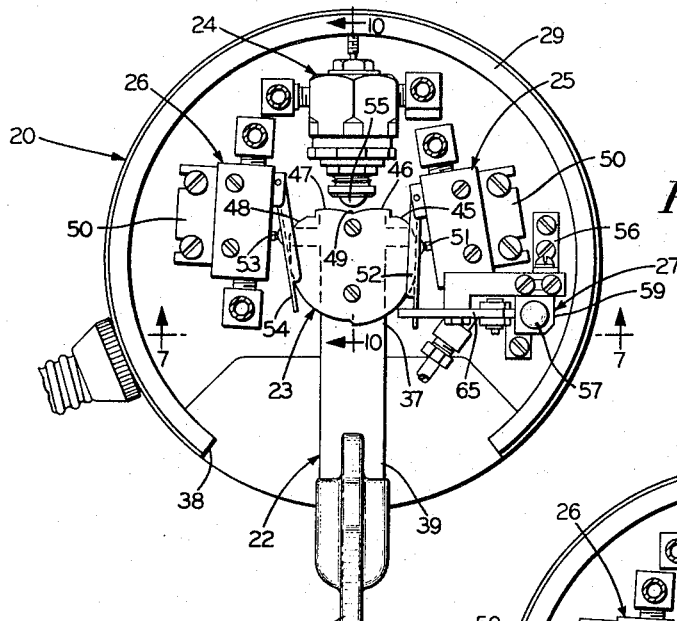
Figure 5:
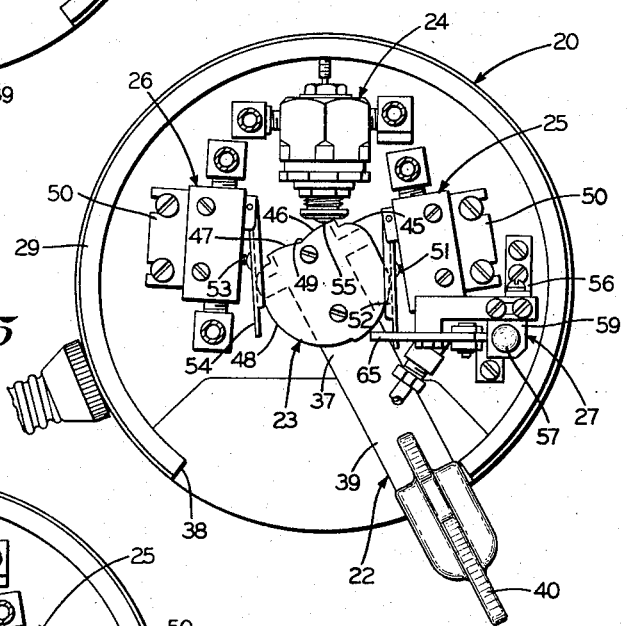
Figure 6:
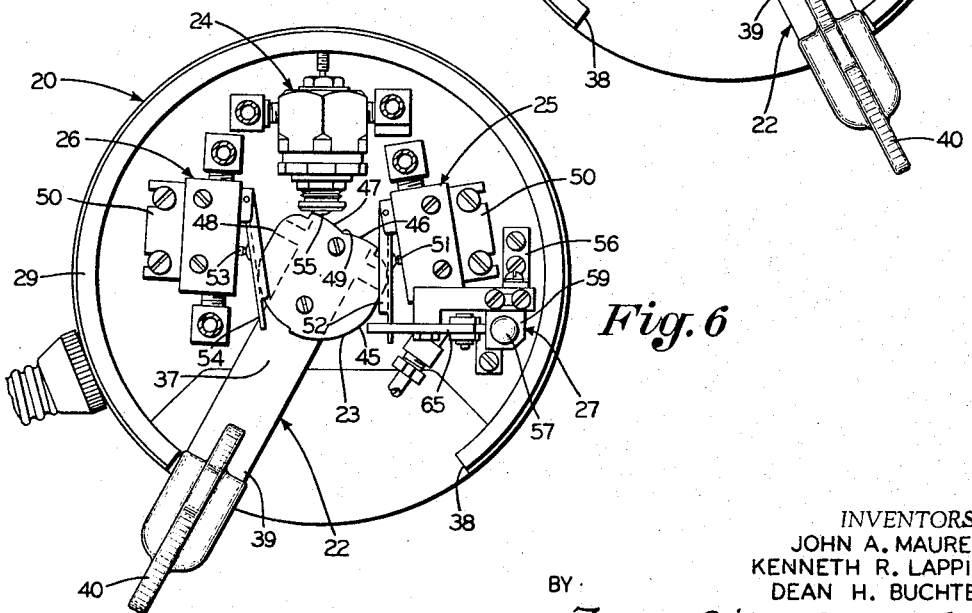
Figure 7:
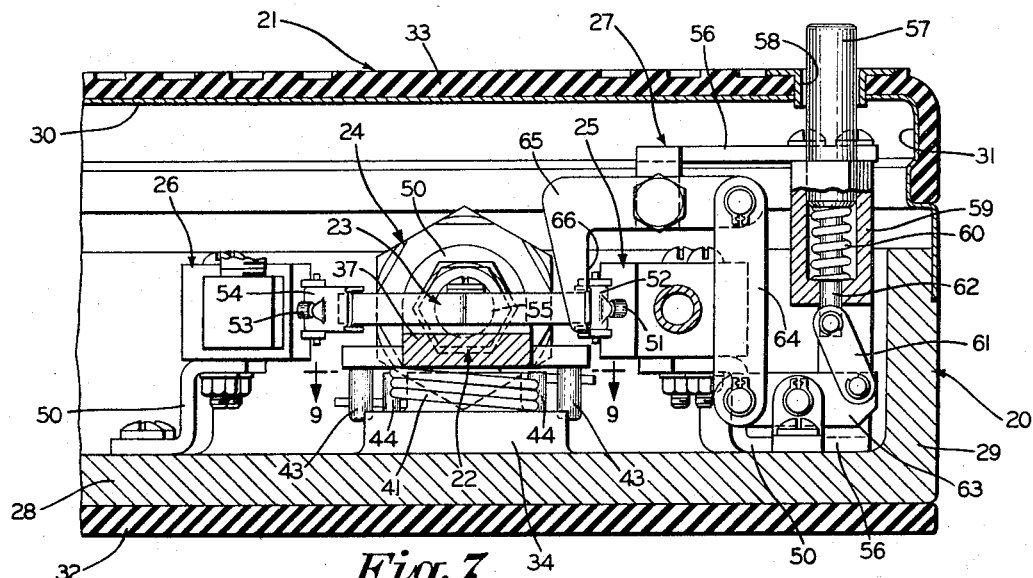
Figure 9:
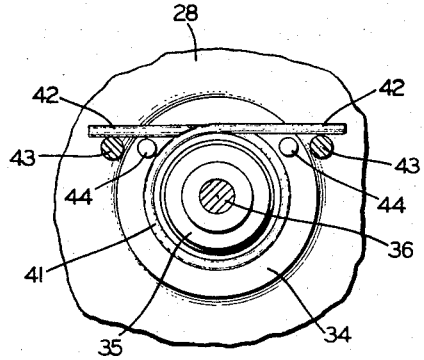
Figure 8:
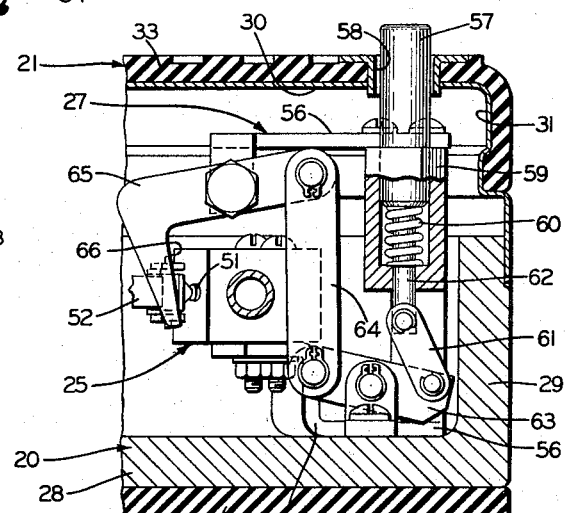
Figure 10:
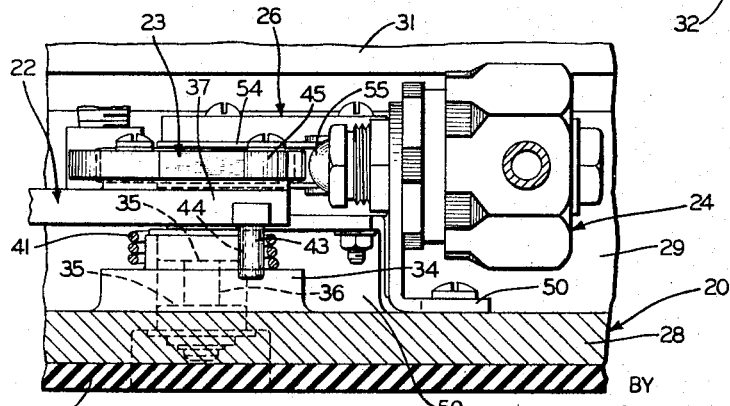

By way of example, embodiments of the improved dental foot control construction of the present invention are illustrated in the accompanying drawings forming a part hereof, wherein like numerals indicate similar parts throughout the several views, and in which:

FIG. 1 is a top plan view of a dental foot control incorporating the improvements of the present invention;

FIG. 2, a side elevation of the foot control of FIG. 1;

FIG. 3, a top plan view of the foot control of FIG. 1 with the cover removed and showing the internal parts thereof;

FIG. 4, a view similar to FIG. 3 but with various of the air distribution lines and couplings removed to show the various drive and coolant control valves, and with the operating arm in normal or neutral non-actuating position;

FIG. 5, a view similar to FIG. 4 but with the operating arm in one of the actuating positions and having moved all three of the drive, air coolant, and water coolant control valves to operating positions;

FIG. 6, a view similar to FIG. 4 but with the operating arm moved to the other actuating position and having moved the drive and air coolant control valves to operating position, while the water coolant valve remains in normal non-operating position;

FIG. 7, an enlarged fragmentary sectional view, part in elevation, looking in the direction of the arrows 7—7 in FIG. 4, but with the cover of the foot control mounted thereon and showing the independent air cleaning or chip blowing control arranged for selectively operating the air coolant control valve independent of any operation of the drive and water coolant control valves, and with such chip blowing control in normal non-actuating position;

FIG. 8, a view similar to FIG. 7 and showing the chip blowing control of FIG. 7 in actuating position having moved the air coolant control valve to operating position;

FIG. 9, a fragmentary horizontal sectional view, part in elevation, looking in the direction of the arrows 9—9 in FIG. 7;

FIG. 10, an enlarged fragmentary sectional view, part in elevation, looking in the direction of the arrows 10—10 in FIG. 4.

Figure 11:
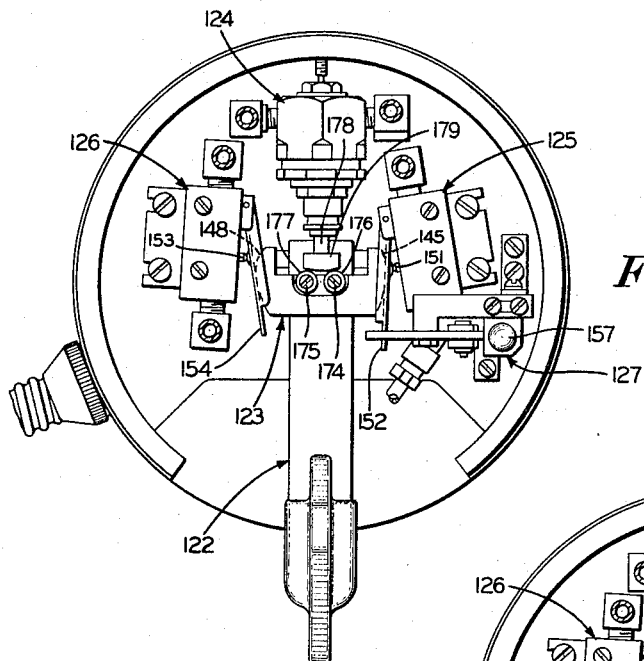
Figure 12:
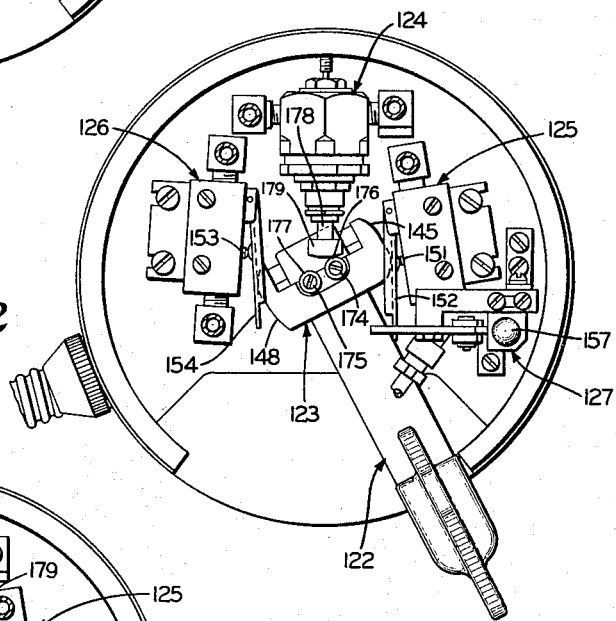
Figure 13:
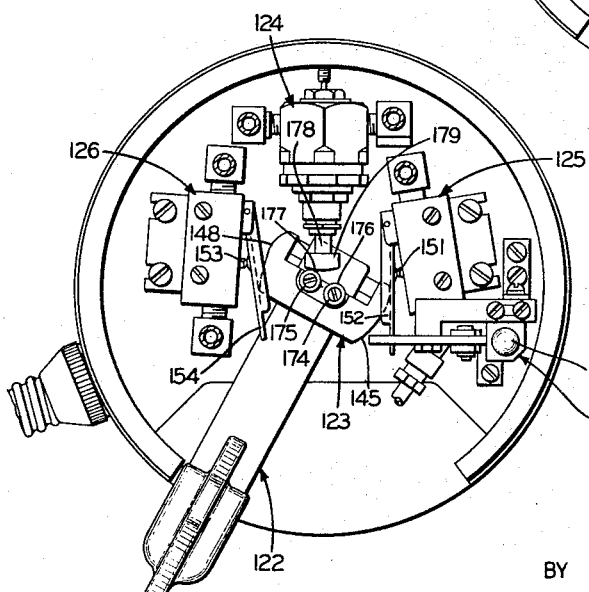

FIG. 11, a view similar to FIG. 4 of a second embodiment of a dental foot control incorporating the improvements of the present invention, with the operating arm in normal or neutral non-actuating position;

FIG. 12, a view similar to FIG. 11 but with the operating arm in one of the actuating positions and having moved all three of the drive, air coolant, and water coolant control valves to operating positions; and FIG. 13, a view similar to FIG. 11 but with the operating arm moved to the other actuating position and having moved the drive and air coolant control valves to operating position, while the water coolant control valve remains in normal non-operating position.

The particular embodiments of the dental foot control construction of the present invention shown in the drawings and hereinafter described are for use in the general arrangement of dental instrument unit disclosed in the co-pending application entitled, "Dental Instrument Unit Construction," Ser. No. 408,155 filed Nov. 2, 1964. As disclosed therein, air driven dental handpieces are provided having air coolant and water coolant spray devices thereon, arranged such that an air coolant spray alone may be provided at the dental handpiece from the air coolant spray device thereof, or a mixed air and water coolant spray may be provided by a simultaneous air coolant spray from the air coolant spray device and water coolant spray from the water coolant spray device.

Furthermore, as also described in said co-pending application, Ser. No. 408,155, the air flow for the air drive of the dental handpieces and the air flow for the air coolant spray devices of the dental handpieces are directed from and controlled at the foot control. The flow of water for the water coolant spray devices, however, is directed from and controlled by an air-actuated water valve positioned remote from the foot control in the dental instrument unit, with the flow of air for actuating this air-actuated water valve being directed from and controlled at the foot control.

Although the particular embodiments illustrated and described herein are arranged for use with the particular dental instrument unit of said co-pending application, Ser. No. 408,155, it should be understood that the broader principles of the present invention may be applied equally as well to dental foot controls for use with other types of dental instrument units and even other than air driven dental handpieces, for instances, electrically driven dental handpieces, and such uses are fully contemplated.

Referring to FIGS. 1 through 6 of the drawings, the embodiment of the dental foot control construction of the present invention illustrated in FIGS. 1 through 10 includes a base, generally indicated at 20, a cover, generally indicated at 21, a foot actuated operating arm, generally indicated at 22, an operating cam, generally indicated at 23, an air drive control valve, generally indicated at 24, an air coolant control valve, generally indicated at 25, a water coolant control valve, generally indicated at 26, and a chip blowing control device, generally indicated at 27. As hereinbefore stated, in the particular embodiment shown, the air flows for the air drive and air coolant spray are controlled directly at the foot control, as is the air flow controlling the air actuated water valve for the water coolant spray, so that all three of the air drive, air coolant and water coolant control valves in the foot control are air valves controlling flows of air therethrough.

The base 20 is hollow, generally cylindrical, having a flat bottom wall 28, upstanding cylindrical side wall 29 and opens upwardly, being telescoped by the hollow, generally cylindrical cover 21 formed by the flat top wall 30 and hollow cylindrical side wall 31. Both the bottom wall 28 of base 20 and the top wall 30, as well as a part of the side wall 31 of cover 21, are provided with resilient material cushioning members 32 and 33, respectively, in the usual fashion.

As best seen in FIGS. 3 through 7 and 10, the operating arm 22 is mounted on the base 20 for horizontal pivotal movement through a central boss 34 projecting upwardly from the base bottom wall 28 and receiving a pair of spaced bearings 35 which, in turn, pivotally mount a pivot pin 36 projecting downwardly from the inner end 37 of the operating arm. Further, operating arm 22 extends horizontaly outwardly through a cutout 38 formed through the base side wall 29 and is provided at the outer end 39 thereof with the preferably resilient material covered operating pedal 40.

A torsion spring 41 is positioned surrounding the upper portion of the boss 34 on base 20 underlying the operating arm inner end 37, which spring is provided with ends 42 engaging the spaced downwardly projecting spring pins 43 mounted on the operating arm inner end 37, as best seen in FIGS. 7, 9 and 10. Also engaging the spring ends 42 are the spaced upwardly projecting stop pins 44 mounted in the boss 34 inwardly adjacent each of the spring pins 43.

Thus, with this pivot-spring arrangement, the operating arm 22 is normally resiliently urged by torsion spring 41 through engagement of the spring pins 43 with the spring ends 42 to a neutral position, horizontally midway of the base cutout 38, as shown in FIGS. 3 and 4. At the same time, the operating arm 22 is selectively horizontally pivotal to either side of this neutral position and to either of the extremities of the base cutout 38, as shown in FIGS. 5 and 6, against the resilient force of torsion spring 41. During this pivotal movement, one of the spring pins 43 forces one of the spring ends 42 through an arc deforming the torsion spring 41, while the stop pin 44 at the opposite spring pin 43 substantially retains the other spring end 42 against movement despite the fact that such opposite spring pin 43 has been pivoted away from that spring end 42.

As best seen in FIGS. 3 through 7 and 10, the operating cam 23 is secured on and overlying the operating arm inner end 37, and is formed with the side cam surface 45, the spaced forward cam surfaces 46 and 47, and the side cam surface 48. The side cam surfaces 45 and 48 are similarly arcuately formed, but of slightly different configuration to provide the cam functions to be hereinafter described, whereas the forward cam surfaces 46 and 47 are formed substantially identical, but oppositely arcuately extending, so as to provide a depression 49 therebetween, again for the cam functions to be hereinafter described.

Referring to FIG. 4, with the operating arm 22 in its normal neutral position, the air coolant control valve 25 is positioned adjacent the side cam surface 45, the air drive control valve 24 is positioned forward of and aligned with the depression 49 between the forward cam surfaces 46 and 47, and the water coolant control valve 26 is positioned adjacent the side cam surface 48. All of the control valves 24, 25 and 26 are normally closed valves normally interrupting the flow of air therethrough and requiring movement from this non-operating position to an operating position in which the flow of air is directed therethrough. Also, all of the control valves 24, 25 and 26 are adjustably mounted on the base bottom wall 28 through appropriate mounting brackets 50 in the usual manner.

Air coolant control valve 25 is generally of usual construction and is formed with the spring pressed plunger 51 normally urged resiliently to extended position, as shown in FIG. 4, in which the valve 25 is normal closed or non-operating position interrupting the flow of air therethrough. Furthermore, plunger 51 of air coolant control valve 25 is controlled for inward movement to operating position in which the flow of air is directed through the valve 25 by the pivotal operating arm 52, which merely bears against the outer end of plunger 51 and also abuts the side cam surface 45 of operating cam 23.

Water coolant control valve 26 is virtually identical to air coolant control valve 25, only oppositely disposed. Thus, water coolant control valve 26 has the spring pressed plunger 53 normally resiliently urged to extended position in which valve 26 is in normal non-operating position interrupting the flow of air therethrough, with this plunger 53 bearing at the outer end thereof against the pivotal operating arm 54 for depression inwardly to operating position in which the flow of air is directed through valve 26. Operating arm 54 of the water coolant control valve 26 in turn abuts the side cam surface 48 of the operating cam 23.

The air drive control valve 24 is of different construction from the air and water coolant control valves 25 and 26, but is likewise of a usual construction. This air drive control valve 24 is provided with the spring pressed ball 55 normally resiliently urged outwardly into normal non-operating position in which the valve 24 is likewise in normal non-operating position interrupting the flow of air therethrough. Furthermore, ball 55 of valve 24 when engaged and moved inwardly, moves the valve 24 to operating position in which the flow of air is directed therethrough.

Thus, as shown in FIG. 4, due to the particular locations of the air drive, air coolant and water coolant control valves 24, 25 and 26, and the particular configurations of the various cam surfaces 45, 46, 47 and 48 on the operating cam 23, when the operating arm 22 is in neutral position into which this operating arm is normally resiliently urged by the torsion spring 41, as previously described, air drive control valve 24 is in normal non-operating position with the operating ball 55 thereof positioned at the depression 49 between the forward cam surfaces 46 and 47 of operating cam 23, air coolant control valve 25 is in normal non-operating position with plunger 51 extended and operating arm 52 bearing against the side cam surface 45 of operating cam 23, and water coolant control valve 26 is in normal non-operating position with the plunger 53 extended and the operating arm 54 bearing against the side cam surface 48 of operating cam 23.

The particular configurations of the various cam surfaces 45, 46, 47 and 48 on the operating cam 23 are formed such that when the operating arm 22 is pivoted to a first actuating position, that is, to the left as shown in FIG. 6, the left-hand forward cam surface 47 on operating cam 23 angages and depresses or moves inwardly the operating ball 55 of air drive control valve 24, thereby moving valve 24 to operating position in which the flow of air is directed therethrough. At the same time, side cam surface 45 on operating cam 23, through sliding engagement with the operating arm 52 of the air coolant control valve 25, depresses or moves inwardly the plunger 51 of valve 25, thereby moving this valve to operating position directing the flow of air therethrough. Finally, at the same time, although the side cam surface 48 of operating cam 23 is slidably engaged with the operating arm 54 of water coolant control valve 26, due to the particular configuration of this side cam surface 48 and the particular movement of operating cam 23, the position of the plunger 53 of water coolant control valve 26 is not affected, so that this plunger 53 remains in normal extended position and valve 26 remains in normal non-operating position interrupting the flow of air therethrough.

When the operating arm 22 is pivoted to a second actuating position, that is, to the right as shown in FIG. 5, the right-hand forward cam surface 46 of operating cam 23 engages and depresses ball 55 of air drive control valve 24, and side cam surface 45 of cam 23 forces operating arm 52 to depress plunger 51 of air coolant control valve 25, thereby moving both the air drive and air coolant control valves 24 and 25 to operating positions directing the flows of air therethrough. In this case, and again due to the particular configuration of the side cam surface 48 on operating cam 23, this side cam surface 48 moves the operating arm 54 of water coolant control valve 26 to a position forcing the depression of plunger 53 of this valve 26, thereby placing the valve 26 along with valves 24 and 25 in operating position directing the flow of air therethrough.

Return of the operating arm 22 to normal neutral position, that shown in FIG. 4, from either of the actuating positions shown in FIGS. 5 and 6 is automatic when manual pressure against operating arm 22 is released, in view of the previously described resilient urging of the torsion spring 41. Also, when this operating arm 22 returns to this normal neutral position, the resilient urging of each of the balls 55 on air drive control valve 24, plunger 51 on air coolant control valve 25, and plunger 53 on water coolant control valve 26, automatically returns all three of these valves 24, 25 and 26 to normal non-operating positions in which the flows of air therethrough is interrupted or stopped.

As seen in FIGS. 3 through 6 and shown in enlarged view in normal non-actuating positions in FIGS. 7 and 8, respectively, the independent cleaning or chip blowing control device 27 is mounted through appropriate mounting brackets 56 on the base bottom wall 28. As shown, a vertically depressible plunger 57 is mounted resiliently urged upwardly to non-actuating position extending through an appropriate opening 58 in cover 21 by a guide 59, which guide vertically reciprocally receives the lower portion of plunger 57 and encloses the compression spring 60 which operates to resiliently urge the plunger upwardly.

Plunger 57 is pivotally connected to the linkage bar 61 through the vertically extending plunger arm 62 which compression spring 60 surrounds, and linkage bar 61 is in turn pivotally connected to the pivot bar 63 which is pivotally mounted on the base bottom wall 28 through the mounting brackets 56. Still further, pivot bar 63 is in turn pivotally connected to the generally vertically extending linkage bar 64 which is in turn pivotally connected to the generally L-shaped actuating arm 65. Finally, actuating arm 65 is positioned pivotal on the mounting brackets 56 with the actuating surface 66 of actuating arm 65 bearing against an outer end portion of the previously described operating arm 52 of air coolant control valve 25.

Thus, as shown in FIGS. 7 and 8, the chip blowing plunger 57 is operably connected through a bell-crank arrangement with the operating arm 52 of air coolant control valve 25, with this plunger 57 normally being resiliently urged upwardly to a non-actuating position by the compression spring 60. As shown in FIG. 7, in such non-actuating position, and despite the engagement of the actuating surface 66 of actuating arm 65 with the operating arm 52 of the air coolant control valve 25, this chip blowing control device 27 has no affect on this air coolant control valve 25 so that the valve remains in its normal non-operating position interrupting the flow of air therethrough as far as the chip blowing control device is concerned, as shown in FIG. 7. When, however, as shown in FIG. 8, plunger 57 is depressed compressing spring 60, the actuating arm 65 is pivoted through plunger arm 62, linkage bar 61, pivot bar 63, and linkage bar 64, causing the actuating surface 66 of this actuating arm to force the operating arm 52 of air coolant control valve 25 inwardly, thereby depressing the plunger 51 of this valve 25 and moving the valve to operating position in which the flow of air is directed therethrough.

In this manner, an independent control is provided for the air coolant control valve 25 which is separate and distinct from the operating arm 22 and operating cam 23, and the movement of this arm and cam.

Referring particularly to FIG. 3, the main air flow supply to the dental foot control enters through air supply line 67 into a manifold 68, and from manifold 68 is distributed to the air drive control valve 24 through an air supply line 69, to the air coolant control valve 25 through an air supply line 70, and downwardly through a short connection (not shown) to the water coolant control valve 26. The flow of air from the air drive control valve 24 leaves the dental foot control through the air supply line 71 for the main drive of the turbine of a dental handpiece, from the air coolant control valve 25 through an air supply line 72 for the air coolant spray on the dental handpiece, and from the water coolant control valve 26 through the air supply line 73 for the control of an air actuated water valve which supplies the flow of water to the water coolant spray device on the dental handpiece, as previously discussed.

The various supply lines and the connections thereof to the various control valves are of conventional construction and do not enter into the improvements of the present invention other than in the particular combination shown. Furthermore, the means whereby the appropriate supply lines are connected into a dental instrument unit and to the particular air turbine dental handpiece and coolant sprays thereon is clearly disclosed and set forth in our previously mentioned co-pending application Ser. No. 408,155, and attention is directed to such co-pending application for the specific details.

Thus, according to the principles of the present invention and as specifically applied in the first embodiment illustrated in FIGS. 1 through 10 and described in the foregoing, when the operating arm 22 of the dental foot control is in its normal position, as shown in FIG. 4, all of the air drive, air coolant and water coolant control valves 24, 25 and 26 are in normal non-operating positions in which the various flows of air therethrough is interrupted, that is, assuming that the previously described chip blowing control device 27 is not actuated. Thus, the air turbine of the air driven dental handpiece is not driven and there are no air or water coolant sprays from the air and water coolant spray devices on the dental handpiece.

When the operating arm 22 of the dental foot control is moved to a first actuating position, as shown in FIG. 6, the air drive control valve 24 and air coolant control valve 25 are each moved to the operating positions directing the flow of air therethrough, while the water coolant control valve 25 remains in normal non-operating position, still interrupting the flow of air therethrough. Thus, a flow of air is directed to the air turbine of the dental handpiece for driving the same and also a flow of air is directed to the air coolant spray device on the dental handpiece for providing an air coolant spray.

When the operating arm 22 of the dental foot control is moved to second actuating position, as shown in FIG. 5, all three of the air drive, air coolant, and water coolant control valves 24, 25 and 26 are moved to operating positions directing flows of air therethrough. Thus, the air turbine of the dental handpiece is driven, the air coolant device of the dental handpiece is provided with a supply of air for providing an air coolant spray, and the air flow from the water coolant control valve 26 actuates an air-actuated water valve so as to supply a flow of water to the water coolant spray device on the dental handpiece and provide a water coolant spray for mixing with the air coolant spray.

Finally, when it is desirable for the dentist to clean or blow out a cavity being prepared, the plunger 57 of the chip blowing control device 27 may be depressed while the operating arm 22 remains in normal neutral position, which results in the actuating arm 65 of control device 27 moving the air coolant control valve 25 to operating position directing a flow of air therethrough, without affect on and while the air drive and water coolant control valves 24 and 26 remain in normal non-operating positions. This directs a flow of air to the air coolant spray device on the dental handpiece and thereby provides merely an air spray from the air coolant spray device without the handpiece being driven nor any water coolant spray being provided.

In the second embodiment of the present invention, the dental foot control construction is virtually identical in all respects with the exception of the operating cam on the operating arm, and the particular operating means on the air drive control valve for moving this control valve between non-operating and operating positions. As shown in FIGS. 11, 12 and 13, the operating cam, generally indicated at 123, is formed with the side cam surface 145, the spaced forward cam rollers 174 and 175 forming the spaced forward cam surfaces 176 and 177, respectively, and the side cam surface 148.

In this second embodiment, the side cam surface 145 and 148 are formed virtually identical to the first embodiment and operate in the same manner relative to the air coolant control and water coolant control valves 125 and 126. The air drive control valve 124 in this case, however, is provided with the spring pressed operating plunger 178, having the operating bar 179 thereon and normally bearing against the cam surface 176 and 177 of the cam rollers 174 and 175.

Thus, as shown in FIG. 11, again due to the particular locations of the air drive, air coolant and water coolant control valves 124, 125 and 126, and the particular configurations of the various side cam surfaces 145 and 148 and forward roller cam surfaces 176 and 177 on the operating cam 123, when the operating arm 122 is in neutral position into which this operating arm is normally resiliently urged, as previously described, air drive control valve 124 is in normal non-operating position with the operating bar 179 on a plunger 178 merely bearing equally on the cam surfaces 176 and 177 of cam rollers 174 and 175. At the same time, air coolant control valve 125 is in normal non-operating position with plunger 151 extended and operating arm 152 bearing against the side cam surface 145 of operating cam 123, and water coolant control valve 126 is in normal non-operating position with the plunger 153 extended and the operating arm 154 bearing against the side cam surface 148 of operating cam 123.

Also as before, the particular configurations of the side cam surfaces 145 and 148, as well as the roller cam surfaces 176 and 177, all on operating cam 123, are formed and positioned such that when the operating arm 122 is pivoted to a first actuating position, which is to the left as shown in FIG. 13, the left-hand forward cam roller 175, through the roller cam surface 177 bearing against the operating bar 179 of the air drive control valve plunger 178, moves plunger 178 inwardly, thereby moving valve 124 to operating position in which the flow of air is directed therethrough.

At the same time, side cam surface 145 on operating cam 123, through sliding engagement with the operating arm 152 of the air coolant control valve 125, depresses or moves inwardly the plunger 151 of valve 125, thereby moving this valve to operating position directly the flow of air therethrough. Finally, at the same time, although the side cam suface 148 of operating cam 123 is slidably engaged with the operating arm 154 of water coolant control valve 126, due to the particular configuration of this side cam surface 148 and the particular movement of operating cam 123, the position of the plunger 153 of water coolant control valve 126 is not affected, so that this plunger 153 remains in normal extended position and valve 126 remains in normal non-operating position interrupting the flow of air therethrough.

When the operating arm 122 is pivoted to its second actuating position, which is to the right as shown in FIG. 12, the right-hand forward cam roller 174 of operating cam 123 moves plunger 178 of air drive control valve 124 inwardly, and side cam surface 145 of cam 123 forces operating arm 152 to depress plunger 151 of air coolant control valve 125, thereby moving both the air drive and air coolant control valves 124 and 125 to operating positions directing the flows of air therethrough. At the same time, and again due to the particular configuration of the side cam surface 148 on operating cam 123, this side cam surface 148 moves the operating arm 154 of water coolant control valve 126 to a position forcing the depression of plunger 153 of this valve 126, thereby placing the valve 126, along with valves 124 and 125, in operating position directing the flow of air therethrough.

As in the first embodiment, return of the operating arm 122 to normal neutral position, that shown in FIG. 11, from either of the actuating positions shown in FIGS. 12 and 13 is automatic when manual pressure against operating arm 122 is released, in view of the particular resilient urging of this operating arm 122 as previously described. Also as in the first embodiment, when this operating arm 122 returns to this normal neutral position, the resilient urging of each of the plunger 178 on air drive control valve 124, plunger 151 on air coolant control valve 125, and plunger 153 on water coolant control valve 126 automatically returns all three of these valves 124, 125 and 126 to normal non-operating positions in which the flows of air therethrough are interrupted or stopped.

As seen in FIGS. 11, 12 and 13, the independent cleaning or chip blowing control device 127 in this second embodiment is virtually identical to that shown and described in the first embodiment, and operates in the identical manner. Again, therefore, an independent control is provided for the air coolant control valve 125 which is separate and distinct from the movement of the operating arm 122 and operating cam 123, so that when it is desirable for the dentist to clean or blow out a cavity being prepared, the plunger 157 of the chip blowing control device 127 may be depressed while the operating arm 122 remains in normal neutral position, which results in a flow of air to the air coolant spray device on the dental handpiece and provides merely an air spray from this air coolant spray device without the handpiece being driven nor any water coolant spray being provided.

Thus, according to the principles of the present invention, the dental foot control construction provides the dentist wtih the choice of the coolant spray desired simultaneously with the drive of the dental handpiece, with such choice being made by the dentist merely by selecting which actuating position into which he moves the operating arm 22 or 122 of the foot control. Furthermore, such choice may be made and the type of coolant spray varied as desired without interruption of the dental work being performed nor the distraction of the dentist's attention from such dental work.

Also according to the principles of the present invention, the dentist may provide solely an air coolant spray from the dental handpiece without the handpiece being driven and without providing a water coolant spray, merely by actuating the chip blowing control device 27 or 127. In this manner, air cleaning and chip blowing operations may be performed quickly and efficiently by the dentist without the necessity of use of other dental instruments, such as the usual dental syringe.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous new and useful results obtained thereby, the new and useful constructions and reasonable mechani-

We claim:

1. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, said actuating means being cam means mounted on and pivotal directly with the operating arm, said cam means including side cam surface means engaging and moving the air coolant control means to operating position when said operating arm is pivoted to either of said first and second actuating positions, side cam surface means engaging and moving the water coolant control means to operating position when said operating arm is pivoted to second actuating position and being free of moving the water coolant control means from normal non-operating position when said operating arm is pivoted to first actuating position, and spaced forward cam surface means one of which engages and moves the drive control means to operating position when said operating arm is pivoted to first actuating position and the other of which engages and moves the drive control means to operating position when said operating arm is pivoted to the second actuating position.

2. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and on operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, the means mounting the operating arm on the base including pivot means mounting said operating arm selectively pivotal from a normal neutral position in one direction to said first actuating position and in the opposite direction to said second actuating position, and means resiliently urging said operating arm into neutral position between said first and second actuating positions.

3. Dental foot control construction as defined in claim 2, in which each of the drive control means and air coolant control means and water coolant control means include resiliently urged members normally resiliently urged to non-operating positions in which said control means are in non-operating positions and selectively movable to operating positions in which said control means are in operating positions.

4. Dental foot control construction as defined in claim 2 in which the dental handpiece is of the type in which the water coolant spray device is controlled through an air actuated water valve; and in which the drive control means and air coolant control means and water coolant control means are air valves each interrupting the flow of air therethrough when in normal non-operating position and directing the flow of air therethrough when in operating position.

5. Dental foot control construction as defined in claim 2 in which the actuating means is cam means and is mounted on and pivotal directly with the operating arm; and in which the cam means includes cam surface means engaging and moving the air coolant control means to operating position when said operating arm is pivoted to either of said first and second actuating positions, cam surface means engaging and moving the water coolant control means to operating position when said operating arm is pivoted to second actuating position and being free of moving the water coolant control means from normal non-operating position when said operating arm is pivoted to first actuating position, and cam surface means engaging and moving the drive control means to operating position when said operating arm is pivoted to either of the first and second actuating positions.

6. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, an independent air coolant control actuating means mounted on the base and selectively movable between a normal non-actuating and an actuating position, and means operably connecting said independent actuating means to the air coolant control means for movement of said air coolant control means to operating position when said independent actuating means is moved to actuating position and independent of any movement of the operating arm; whereby, movement of said independent actuating means to actuating position will move the air coolant control means to operating position and provide an air coolant spray from the dental handpiece air coolant spray device independent of any operation of the drive of the dental handpiece and any operation of the dental handpiece water coolant spray device.

7. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, an independent air coolant control actuating plunger mounted on the base and selectively movable between a normal non-actuating and an actuating position, means operably connected to said actuating plunger resiliently urging said actuating plunger to normal non-actuating position, and pivot arm means constructed and arranged operably connecting said actuating plunger to the air coolant control means for movement of said air coolant control means to operating position when said actuating plunger is moved to actuating position and independent of any movement of the operating arm; whereby, movement of said independent actuating plunger to actuating position will move the air coolant control means to operating position and provide an air coolant spray from the dental handpiece air coolant spray device independent of any operation of the drive of the dental handpiece and any operation of the dental handpiece water coolant spray device.

8. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating position when said operating arm is pivoted to second actuating position, the actuating means being cam means and being mounted on and pivotal directly with the operating arm, said cam means including side cam surface means engaging and moving the air coolant control means to operating position when said operating arm is pivoted to either of said first and second actuating positions, side cam surface means engaging and moving the water coolant control means to operating position when said operating arm is pivoted to second actuating position and being free of moving the water coolant control means from normal non-operating position when said operating arm is pivoted to first actuating position, and spaced forward cam surface means one of which engages and moves the drive control means to operating position when said operating arm is pivoted to first actuating position and the other of which engages and moves the drive control means to operating position when said operating arm is pivoted to second actuating position; in which an independent air coolant control actuating means is mounted on the base selectively movable between a normal non-actuating and an actuating position, and means operably connecting said independent actuating means to the air coolant control means for movement of said air coolant control means to operating position when said independent actuating means is moved to actuating position and independent of any movement of the operating arm; whereby, movement of said independent actuating means to actuating position will move the air coolant control means to operating position and provide an air coolant spray from the dental handpiece air coolant spray device independent of any operation of the drive of the dental handpiece and any operation of the dental handpiece water coolant spray device.

9. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, the means mounting the operating arm on the base including pivot means mounting said operating arm selectively pivotal from a normal neutral position in one direction to said first actuating position and in the opposite direction to said second actuating position, and means resiliently urging said operating arm into normal neutral position between said first and second actuating positions, each of the drive control means and air coolant control means and water coolant control means including resiliently urged members normally resiliently urged to non-operating positions in which said control means are in non-operating positions and selectively movable to operating positions in which said control means are in operating positions, the actuating means being cam means and being mounted on and pivotal directly with the operating arm, said cam means including side cam surface means engaging and moving the resiliently urged member of the air coolant control means to operating position when said operating arm is pivoted to either of said first and second actuating positions, side cam surface means engaging and moving the resiliently urged member of the water coolant control means to operating position when said operating arm is pivoted to second actuating position and being free of moving the resiliently urged member of the water coolant control means from non-operating position when said operating arm is pivoted to first actuating position, and spaced forward cam surface means one of which engages and moves the resiliently urged member of the drive control means to operating position when said operating arm is pivoted to first actuating position and the other of which engages and moves the resiliently urged member of the drive control means to operating position when said operating arm is pivoted to the second actuating position, an independent air coolant control actuating member mounted on the base and selectively movable between a normal non-actuating and an actuating position, means operably connected to said actuating plunger resiliently urging said actuating plunger to normal non-actuating position, and pivot arm means constructed and arranged operably connecting said actuating plunger to the air coolant control means for movement of said air coolant control means to operating position when said actuating plunger is moved to actuating position and independent of any movement of the operating arm; whereby, movement of said independent actuating plunger to actuating position will move the air coolant control means to operating position and provide an air coolant spray from the dental handpiece air coolant spray device independent of any operation of the drive of the dental handpiece and any operation of the dental handpiece water coolant spray device.

10. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, the actuating means being cam means and being mounted on and pivotal directly with the operating arm, said cam means including side cam surfaces engaging and moving the air coolant control means to operating position when said operating arm is pivoted to either of said first and second actuating positions, side cam surface means engaging and moving the water coolant control means to operating position when said operating arm is pivoted to second actuating position and being free of moving the water coolant control means from normal non-operating position when said operating arm is pivoted to first actuating position, and spaced forward roller means providing spaced forward roller cam surface means one of which engages and moves the drive control means to operating position when said operating arm is pivoted to first actuating position and the other of which engages and moves the drive control means to operating position when said operating arm is pivoted to second actuating position.

11. Dental foot control construction of the type for remotely controlling the drive operation of a dental handpiece having air and water coolant spray devices thereon, including a base, an operating arm, means mounting the operating arm on the base selectively pivotal between a normal non-actuating position and at least first and second actuating positions, drive control means mounted on the base selectively movable between a normal non-operating and an operating position operably connected to the dental handpiece for operating the drive of the dental handpiece when in the operating position, air coolant control means mounted on the base selectively movable between a normal non-operating and an operating position operably connected to the dental handpiece air coolant spray device for providing an air coolant spray from said spray device when in operating position, water coolant control means mounted on the base selectively movable between a normal non-operating and an operating position operably connected to the dental handpiece water coolant spray device for providing water coolant from said spray device when in operating position, actuating means operably connected to the operating arm constructed and arranged free of moving any of said control means from normal non-operating position when said operating arm is in the normal non-actuating position, said actuating means being constructed and arranged for moving the drive and air coolant control means to operating positions and being free of moving the water coolant control means from normal non-operating position when said operating arm is pivoted to first actuating position, and said actuating means being constructed and arranged for moving said drive and air coolant and water coolant control means to operating positions when said operating arm is pivoted to second actuating position, the means mounting the operating arm on the base including pivot means mounting said operating arm selectively pivotal from a normal neutral position in one direction to said first actuating position and in the opposite direction to said second actuating position, and means resiliently urging said operating arm into normal neutral position between said first and second actuating positions, said actuating means being cam means and being mounted on and pivotal directly with the operating arm, said cam means including side cam surface means engaging and moving the air coolant control means to operating position when said operating arm is pivoted to either of said first and second actuating positions, side cam surface means engaging and moving the water coolant control means to operating position when said operating arm is pivoted to second actuating position and being free of moving the water coolant control means from normal non-operating position when said operating arm is pivoted to first actuating position, and spaced forward roller means providing spaced forward roller cam surface means one of which engages and moves the drive control means to operating position when said operating arm is pivoted to first actuating position and the other of which engages and moves the drive control means to operating position when said operating arm is pivoted to second actuating position.

References Cited

UNITED STATES PATENTS 3,296,698   1/1967   Staunt _____ 32—28

FOREIGN PATENTS 348,610   10/1960   Switzerland.

LOUIS G. MANCENE, *Primary Examiner.*

ROBERT E. MORGAN, *Examiner.*